United States Patent Office 2,703,779
Patented Mar. 8, 1955

2,703,779

METHOD OF PREPARING STABLE WATER-SOLUBLE CATALASE OF HIGH POTENCY

August L. Lolli, Chicago, and Edward F. Cavanaugh, Wilmette, Ill., assignors to Armour and Company, Chicago, Ill., a corporation of Illinois No Drawing. Application October 23, 1953, Serial No. 388,056

7 Claims. (Cl. 195—66)

This invention relates to a method of preparing stable, water-soluble catalase of high potency, which method is particularly adapted for use in preparing catalase from liver, although it can also be used in preparing catalase from other catalase-bearing tissues.

It is known that catalase can be extracted from liver and purified by crystallization. However, crystalline catalase tends to be unstable, especially in aqueous solution. Further, it is difficult to get crystalline catalase into aqueous solution because it is quite insoluble in water. On the other hand, the purity and potency of crystalline catalase are desirable characteristics for a catalase product.

Amorphous catalase has also been prepared but prior amorphous catalase preparations have not been of sufficient purity and potency for many applications. Also, these preparations have not been as completely soluble in water as would be desirable.

It is therefore a general object of this invention to provide a method for the preparation of a high potency catalase which is very stable and completely water-soluble. It is a further object to provide a method for producing a catalase preparation of the character described in a minimum number of steps while achieving excellent yields of the purified catalase without employing crystallization. Another object is to provide such a process which can be operated on a commercial scale to obtain substantially uniform and reproduceable results. Still another object is to provide a process which is especially adapted for use in preparing catalase from hog liver. It is also an important object to provide a process of the character described which can be carried out at room temperatures without the necessity of employing refrigeration for any of the steps of the process. Further objects and advantages will appear as the specification proceeds.

In one of its aspects this invention is concerned with a method comprising a sequence of steps for preparing catalase from catalase-bearing tissue in which the catalase is first separated from water-soluble contaminants and then from water-insoluble contaminants. Generally speaking, this integrated sequence of steps involves an extraction of the catalase-bearing tissue with aqueous acetone, a fractionation of this extract at increased acetone concentration to precipitate water-insoluble contaminants, a precipitation of the catalase-active fraction at a still higher acetone concentration, and the extraction of this precipitate with water to selectively extract the catalase while leaving behind the water-insoluble contaminants. The important details relating to the acetone concentrations and the temperatures employed in the various steps will subsequently be discussed.

The starting material for use in the process of this invention can be described generically as catalase-bearing tissue. Mammalian livers and kidneys provide the chief sources of catalase-bearing tissue, especially the livers and kidneys of hogs, sheep and cattle. However, the method of this invention is particularly suitable for use in preparing catalase from hog liver. This is readily available as a source of material, but it has given difficulty in the past because of the contaminants which are intimately associated with the catalase and are separated therefrom only with difficulty. Either fresh or frozen tissue can be used.

To prepare the tissue for extraction it is desirable to reduce it to a subdivided condition by hashing, grinding, etc. If desired, this can be done while the tissue is still in frozen condition. However, this is not essential.

The comminuted catalase-bearing tissue is then extracted with aqueous acetone having an acetone concentration ranging between 20 to 30% by volume. Optimum results are achieved when the acetone concentration is between 23 and 27%. While the extraction can be carried out at low temperatures, as is the usual practice in enzyme extractions, it has been found that not only is it possible to carry out the extraction at room temperature without harmful effect on the catalase but that the use of room temperatures has a further advantage of selectively denaturing unwanted contaminants. This result appears to be achieved at extraction temperatures of about 15 to 30° C. which corresponds with normal room temperatures so that there is ordinarily no need for either heating or cooling the mixture during extraction. The selective denaturation is further promoted by the use of relatively long extraction times. For this purpose the extraction period should last for a minimum of 8 hours and, preferably, for a minimum of 12 to 18 hours.

When the preferred procedure has been followed in the extraction, as discussed above, it is found that substantially all of the catalase can be solubilized and extracted while retarding the solubilization of water-soluble contaminants. The use of temperatures from 15 to 30° C., as indicated above, not only avoids the use of refrigeration which is expensive, but also has the advantage of selectively denaturing and thereby precipitating undesirable contaminants, which are believed to be mostly of the water-soluble type.

If desired, upon completion of the extraction, the tissue residue and other insoluble material can be separated from the extract by centrifugation or filtration. However, this step is optional since the next step involves a further precipitation of insoluble material.

In the next step, the extract, either before or after the separation of the tissue residue, has its acetone concentration increased to above 30% but below 40% by volume. The purpose of this is to precipitate water-soluble contaminants which were solubilized during the extraction. This step can readily be carried out by adding concentrated acetone to the extraction mixture until the desired acetone concentration therein is achieved. Optimum results are obtained when an acetone concentration of between 32 and 37% is used for this precipitation. Here again, it is not only permissible but actually advantageous to carry out the precipitation at temperatures of from 15 to 30° C. (room temperatures).

The catalase-containing extract is then separated from the undissolved material by any suitable method, such as centrifugation, filtration, etc. The extract thus obtained is further processed by increasing the acetone concentration thereof to between 45 and 55% by volume to precipitate the catalase together with water-insoluble contaminants. The preferred acetone concentrations for this step are from 47 to 53%. Within this range it is possible to substantially completely precipitate the catalase without denaturing it even though temperatures of from 15 to 30° C. are employed, as preferred.

The catalase-containing precipitate is then separated from the supernatant solution, preferably by filtration, although other means such as centrifugation can be used. If desired, the mixture can be allowed to settle for several hours to complete the precipitation of the catalase before making this separation.

The catalase-containing precipitate obtained as described above can be immediately used, since it will contain only a very small amount of acetone. However, it is preferred to dry this precipitate in a vacuum oven before proceeding with the process. If desired, this dried material can be stored satisfactorily for several days before proceeding with the process, since it is quite stable.

In the next step the catalase-containing precipitate is extracted with water to selectively solubilize the catalase while leaving behind the bulk of the protein contaminants, which due to the steps previously employed are largely water-insoluble proteins. It has been found that a very great purification can be obtained by this step, and that the insoluble residue will usually comprise more than 50% by weight of the crude catalase-containing material. In other words, the aqueous extract contains the catalase in greatly increased purity and potency. This extraction is also preferably carried out at temperatures of from 15 to 30° C. While the extraction time is not especially critical, extraction periods of from ½ to 2 hours are suitable.

After the separation of the insoluble residue from the catalase extract, the catalase is recovered from the extract. The water extract can be conveniently clarified by centrifugation followed by filtration. The catalase can then be recovered from the clarified extract in the form of a dry powder by lyophilization. Alternatively, the aqueous solution can be concentrated to any suitable level of potency per unit volume if it is desired to use it in such form.

When the process as described above is used to prepare catalase from hog liver, the amorphous catalase powder will usually assay at least 3000 Keil units per gram. This material is completely water-soluble and is very stable both as a dry powder and in aqueous solution. Further, as indicated above, the process has the advantage that all of the steps therein can be carried out at room temperatures.

The method of this invention is further illustrated by the following specific examples.

Example I

Ten pounds of fresh hog liver were macerated by one passage through an Enterprise hasher equipped with a ⅛" perforated plate. A suspension of approximately 25% acetone concentration was made by adding 3785 ml. of water and 2271 ml. of C. P. acetone to the hashed tissue. The mixture was stirred for approximately 10–15 minutes after which the acetone concentration was raised to approximately 35% by the addition of 1400 ml. acetone with stirring. The precipitate resulting from the acetone extractions together with the residual tissue was separated from the extract by gravity filtration. The acetone concentration was brought to 50% by the addition of 3000 ml. of acetone. At this level, the catalase was precipitated along with various protein contaminants. The solid was separated using a Sharples supercentrifuge and the liquid was discarded. The solid was vacuum oven dried at room temperature.

The dried crude catalase amounting to 50 grams and assaying at 1100 Keil units/gram was dissolved in 1 liter of distilled water and the mixture was agitated for 1 hour. The insoluble matter was separated by passing the material through a Sharples centrifuge. The centrifugate was gravity-filtered through paper. The aqueous solution of catalase was packaged as such under sterile conditions into sterile sealed containers.

The amorphous product was prepared from a portion of the aqueous solution by shell freezing and drying of the material in vacuo.

The overall yield of catalase converted in its entirety to the amosphous dry state amounted to 20 grams and assayed at 3500 Keil units.

Example II

The same procedure was applied to a run using 10 pounds of frozen and comminuted hog liver. The acetone precipitate of crude catalase after drying in a vacuum oven at 40° C. assaying at 1000 Keil units per gram. Subsequent treatment following the procedure of Example I produced 18 grams of dried catalase which had a potency of 3700 Keil units/gram.

Example III

A 10 pound batch of frozen horse liver was hashed through a hasher equipped with a ¼" perforated plate. The procedure from this point on was as outlined in Example I yielding an essentially water-soluble acetone precipitate which was vacuum oven dried at 37.8° C. The crude catalase yield was 47 grams which assayed at 1089 Keil units/gram. The final product which totalled 17 grams assayed at 3800 Keil units/gram was completely water-soluble.

Example IV

The use of 10 pounds of frozen sheep liver following the detailed procedure as set forth in Example I gave 41 grams of the dried acetone precipitated product which was essentially water-soluble excepting for contaminants which were separated as previously discussed. The assay value was enhanced from 1200 to 3500 Keil units/gram by the purification steps which yielded 18 grams of water-soluble catalase.

Example V

A 24 pound batch of hog kidney was hashed through a ⅛" perforated plate. The addition of 5701 ml. of water and 4442 ml. of acetone to produce an acetone concentration of approximately 25% produced a precipitate during a 15 minute agitation period. After the addition of 2734 ml. of acetone to raise the concentration to 35%, the precipitate was removed by filtration upon completion of a 15 minute agitation period. The filtrate was then brought to 50% acetone concentration and stirred again for ½ hour. The crude precipitate was isolated by centrifugation and was dried in a vacuum oven maintained at 45° C. The product amounted to 48 grams which assayed at 1000 Keil units/gram. The crude material was dissolved in 2 liters of distilled water and the solution was filtered to remove residual insoluble matter. The shell freezing and drying resulted in the recovery of 20 grams of purified catalase which assayed at 3200 Keil units/gram.

The "Keil unit" referred to in this application is a quantitative measure of catalase activity, which is based on a simple and reproduceable assay procedure. In carrying out this assay procedure the following solutions are prepared:

Sodium acetate buffer—2% glacial acetic acid adjusted to pH 7.2 with 30% NaOH solution.
Enzyme solution No. 1—weight 50 mgs. powdered catalase sample into 250 cc. volumetric flask; make up to mark with sodium acetate buffer solution.
Enzyme solution No. 2—measure 10 ccs. of enzyme solution No. 1 into 250 cc. volumetric flask; make up to mark with sodium acetate buffer solution.
Neutral (pH 7.0) phosphate-citrate buffer—add 3.53 ccs. 0.1 molar citric acid solution to 16.47 ccs. 0.2 molar disodium phosphate solution and mix thoroughly.
0.25% $H_2O_2$ solution
10% $H_2SO_4$ solution
50% KI solution
0.1 N $Na_2S_2O_3$ solution The assay procedure is then carried out as follows:

Add 1 cc. of enzyme solution No. 2 to 20 ccs. 0.25% $H_2O_2$ solution and 5 ccs. neutral phosphate-citrate buffer, and maintain at 25° C. (room temperature) for 10 minutes. At the end of 10 minutes add 2.5 ccs. 10% $H_2SO_4$ solution followed by 10 ccs. 50% KI solution. Allow to stand for 15 minutes and then titrate with 0.1 N $Na_2S_2O_3$ solution until colorless. To prepare the blank add 2.5 ccs. 10% $H_2SO_4$ solution to the substrate solution No. 2, and treat in the same way as the sample.

Based on the determinations made as described above, calculation is made for the Keil units as follows:

$$\frac{(\text{Ccs. of blank} - \text{ccs. of enzyme solution No. 2})}{\text{Sample weight (in gs.) in 1 cc.}} 0.0017 =$$

gs. $H_2O_2$/g. of sample

While in the foregoing specification this invention has been described in relation to preferred embodiments thereof and many details have been set forth, it will be apparent to those skilled in the art that this invention is susceptible to other embodiments and that many of the details can be varied widely without departing from the basic concepts of the invention.

We claim:

1. In a method of preparing a stable water-soluble amorphous catalase of high potency, the steps of extracting catalase-bearing tissue with aqueous acetone having an acetone concentration ranging between 20 to 30% by volume to obtain an extract of catalase while retarding the solubilization of water-soluble contaminants, increasing the acetone concentration in the extract to above 30% but below 40% by volume to precipitate water-soluble contaminants which were solubilized during the extraction, separating the extract from the undissolved material, then further increasing the acetone concentration of the extract to between 45 and 55% by volume to precipitate the catalase together with water-insoluble contaminants, separating the precipitate thus formed from the supernatant solution, and extracting this precipitate with water to selectively solubilize the catalase.

2. The method of claim 1 in which said catalase-bearing tissue is hog liver.

3. The method of claim 2 is which said extraction is carried out at temperatures ranging from 15 to 30° C.

4. In a method of preparing a stable water-soluble amorphous catalase of high potency, the steps of extracting hog liver with aqueous acetone having an acetone concentration ranging from 23 to 27% by volume and being at a temperature of from 15 to 30° C. to obtain an extract of catalase while retarding the solubilization of water-soluble protein contaminants, increasing the acetone concentration in the extract to from 32 to 37% by volume to precipitate water-soluble protein contaminants which were solubilized during the extraction, separating the extract from the undissolved material, further increasing the acetone concentration in the extract to from 47 to 53% by volume to precipitate the catalase together with water-insoluble protein contaminants, separating the precipitate thus formed from the supernatant solution, and extracting the precipitate with water to selectively solubilize the catalase.

5. The method of claim 4 in which all of said steps are carried out at temperatures ranging from 15 to 30° C.

6. In a method of preparing a stable water-soluble amorphous catalase of high potency, the steps of extracting comminuted hog liver with aqueous acetone having an acetone concentration ranging between 20 to 30% by volume for at least 8 hours to obtain an extract of catalase while retarding the solubilization of water-soluble contaminants, increasing the acetone concentration in the extract to above 30% but below 40% by volume to precipitate water-soluble contaminants which were solubilized during the extraction, separating the extract from the undissolved material, then further increasing the acetone concentration of the extract to between 45 and 55% by volume to precipitate the catalase together with water-insoluble contaminants, separating the precipitate thus formed from the supernatant solution, extracting this precipitate with water to selectively solubilize the catalase, separating the catalase extract from the insoluble material, and then lyophilizing the extract to obtain the catalase as a dry powder.

7. The method of claim 6 in which all of said steps except said lyophilizing step are carried out at temperatures ranging from 15 to 30° C.

References Cited in the file of this patent

UNITED STATES PATENTS

| | | |
|---|---|---|
| 2,614,062 | Keil | Oct. 14, 1952 |
| 2,635,069 | Baker | Apr. 14, 1953 |

OTHER REFERENCES

Waksman et al.: Enzymes, 1926, Williams and Wilkins Co., Baltimore, Maryland, pages 252, 254, 255.

Sumner et al.: The Enzymes, vol. 2, part 2, 1951. The Academic Press, New York, pages 409–410.